(12) United States Patent
Brockschmidt et al.

(10) Patent No.: US 11,150,875 B2
(45) Date of Patent: Oct. 19, 2021

(54) AUTOMATED CONTENT EDITOR

(71) Applicant: Microsoft Technology Licensing, LLC, Redmond, WA (US)

(72) Inventors: Marc Manuel Johannes Brockschmidt, Cambridge (GB); Miltiadis Allamanis, Cambridge (GB); Alexander Lloyd Gaunt, Cambridge (GB); Pengcheng Yin, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/145,041

(22) Filed: Sep. 27, 2018

(65) Prior Publication Data

US 2020/0104102 A1   Apr. 2, 2020

(51) Int. Cl.
| | | |
|---|---|---|
| *G06F 8/34* | (2018.01) | |
| *G06F 8/65* | (2018.01) | |
| *G06F 8/71* | (2018.01) | |
| *G06N 3/08* | (2006.01) | |
| *G06F 8/33* | (2018.01) | |

(52) U.S. Cl.
CPC .................. *G06F 8/34* (2013.01); *G06F 8/33* (2013.01); *G06F 8/65* (2013.01); *G06F 8/71* (2013.01); *G06N 3/08* (2013.01)

(58) Field of Classification Search
CPC .... G06F 8/34; G06F 8/65; G06F 8/71; G06N 3/08
USPC ........................................................ 717/113
See application file for complete search history.

(56) References Cited

U.S. PATENT DOCUMENTS

| 9,336,483 | B1* | 5/2016 | Abeysooriya ............ G06N 3/08 |
| 2004/0117766 | A1* | 6/2004 | Mehta .................... G05B 11/32 717/121 |
| 2005/0229154 | A1* | 10/2005 | Hiew ........................ G06F 8/34 717/110 |
| 2013/0138696 | A1* | 5/2013 | Turdakov .............. G06F 16/367 707/794 |
| 2014/0173563 | A1* | 6/2014 | Dias ......................... G06F 8/36 717/123 |
| 2015/0293755 | A1* | 10/2015 | Robins ................ G06F 9/44526 717/104 |
| 2017/0032243 | A1* | 2/2017 | Corrado ................... G06N 3/04 |
| 2017/0212829 | A1* | 7/2017 | Bales ........................ G06F 8/30 |
| 2017/0323636 | A1 | 11/2017 | Xiao et al. |
| 2018/0260793 | A1* | 9/2018 | Li ........................... G06Q 10/20 |

(Continued)

OTHER PUBLICATIONS

Agrawal et al., "Predicting the quality of user contributions via LSTMs", 2016, ACM, 10pg. (Year: 2016).*

(Continued)

*Primary Examiner* — Ryan D. Coyer

(57) ABSTRACT

An editing tool is described which has a memory storing a neural network having been trained to compute a change representation from pairs, each pair comprising a representation of a first version of a content item and a second version of the content item, and for each of the change representations, predict an updated content item from the change representation and the first version of the content item. The editing tool has a processor configured to receive an input content item and to compute an updated version of the input content item according to a change representation, using the neural network.

20 Claims, 10 Drawing Sheets

(56) References Cited

U.S. PATENT DOCUMENTS

| | | | | |
|---|---|---|---|---|
| 2018/0314343 A1* | 11/2018 | Montaldi | ............... | G06F 3/0237 |
| 2019/0042933 A1* | 2/2019 | Powell | ..................... | G06N 3/08 |
| 2019/0065569 A1* | 2/2019 | Boutros | ................ | G06F 16/212 |

OTHER PUBLICATIONS

Radinsky et al., "Predicting Content Change on the Web", 2013, ACM, 10pg. (Year: 2013).*

Allamanis et al., "A Convolutional Attention Network for Extreme Summarization of Source Code," JMLR, 2016, 10pg. (Year: 2016).*

Gu et al., "Deep Code Search," ACM, 2018, 12pg. (Year: 2018).*

Li et al., "CCLearner: A Deep Learning-Based Clone Detection Approach," IEEE, 2017, 12pg. (Year: 2017).*

Wan et al., "Improving Automatic Source Code Summarization via Deep Reinforcement Learning," ACM, 2018, 11 pg. (Year: 2018).*

Allamanis, et al., "Learning to represent programs with graphs.", In Proceedings of International Conference on Representation Learning, Apr. 30, 2018, pp. 1-17.

Bahdanau, et al., "Neural machine translation by jointly learning to align and translate", In Journal of Computing Research Repository, Sep. 1, 2014, pp. 1-15.

Chen, et al., "Tree-to-tree Neural Networks for Program Translation", In Journal of Computing Research Repository, Feb. 2018, pp. 1-16.

Faruqui, et al., "WikiAtomicEdits: A multilingual corpus of Wikipedia edits for modeling language and discourse", In Journal of Computing Research Repository, Aug. 2018, 11 Pages.

Gilmer, et al., "Neural message passing for quantum chemistry", In Proceedings of the 34th International Conference on Machine Learning, Aug. 6, 2017, 14 Pages.

Guu, et al., "Generating Sentences by Editing Prototypes", In Journal of Computing Research Repository, Sep. 2017, 12 Pages.

Li, et al., "Gated Graph Sequence Neural Networks", In Journal of Computing Research Repository, Nov. 2015, 20 Pages.

Liu, et al., "Constrained Graph Variational Autoencoders for Molecule Design", In Journal of Computing Research Repository, May 23, 2018, pp. 1-12.

Maddison, et al., "Structured Generative Models of Natural Source Code", In Proceedings of the 31st international Conference on Machine, Jun. 26, 2014, 9 Pages.

Nguyen, et al., "A Study of Repetitiveness of Code Changes in Software Evolution", In Proceedings of the 28th IEEE/ACM International Conference on Automated Software Engineering, Nov. 11, 2013, pp. 180-190.

Paletov, et al., "Inferring Crypto API rules from Code Changes", In Proceedings of the 39th ACM SIGPLAN Conference on Programming Language Design and Implementation, Jun. 18, 2018, pp. 450-464.

Rolim, et al., "Learning Quick Fixes from Code Repositories", In Journal of Computing Research Repository, Mar. 2018, pp. 1-12.

Rolim, et al., "Learning Syntactic Program Transformations from Examples", In Proceedings of the 39th International Conference on Software Engineering, May 20, 2017, pp. 404-415.

Vinyals, et al., "Pointer Networks", In Proceedings of the Annual Conference on Neural Information Processing Systems, Dec. 7, 2015, pp. 1-9.

Yin, et al., "A Syntactic Neural Model for General-Purpose Code Generation", In Proceedings of the 55th Annual Meeting of the Association for Computational Linguistics (vol. 1: Long Papers), Jul. 30, 2017, 14 Pages.

Alva-Manchego, et al., "Learning How to Simplify From Explicit Labeling of Complex-Simplified Text Pairs", In Proceedings of the Eighth International Joint Conference on Natural Language Processing, Nov. 27, 2017, pp. 295-305.

Ghosh, et al., "Neural Networks for Text Correction and Completion in Keyboard Decoding", In Repository of arXiv: 1709.06429, Sep. 19, 2017, 14 Pages.

"International Search Report and Written Opinion Issued in PCT Application No. PCT/US2019/039671", dated Oct. 22, 2019, 13 Pages.

Zimmermann, et al., "Mining Version Histories to Guide Software Changes", In Proceedings of the 26th International Conference on Software Engineering, May 23, 2004, pp. 563-572.

* cited by examiner

COPYING:

ENCODER:

VERSION 1    VERSION 2

DECODER

VERSION 1

AUTOMATED CONTENT EDITOR

BACKGROUND

Editing content items such as audio files, images, text documents, emails, blog posts, code snippets and other content items is time consuming and difficult for end users to achieve using computer technology. Often the end user is unfamiliar with how to input commands to a computer in order to edit content items, or finds it difficult to do so due to errors in keyboard entry, voice command input errors or gesture input errors. Limits of space and processing ability on resource constrained devices also lead to difficulties when trying to edit content using such resource constrained devices.

The embodiments described below are not limited to implementations which solve any or all of the disadvantages of known content editing methods and apparatus.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is an editing tool comprising: a memory storing a neural network having been trained to compute a change representation from pairs, each pair comprising a representation of a first version of a content item and a second version of the content item, and for each of the change representations, predict an updated content item from the change representation and the first version of the content item. The editing tool has a processor configured to receive an input content item and to compute an updated version of the input content item according to a change representation, using the neural network.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the example and the sequence of operations for constructing and operating the example. However, the same or equivalent functions and sequences may be accomplished by different examples.

One great advantage of electronic storage of documents is the ability to edit them. With the widespread deployment of version control systems, these edits are a source of data which can be exploited in machine learning, for example, as described in various embodiments in this document. In various examples, rules are automatically extracted from common edits to documents to fix grammar, alacrity and style. Similarly, program source code is frequently changed to implement new features, follow best practices and fix bugs. In various examples, rules are automatically extracted from common edits to source code. In a similar way, edits to images, such as to cropping, contrast enhancement and other edits are often made to images using image editing tools. In various examples, ways to automatically edit images to achieve common style changes are described.

The technology described herein gives improved functioning of a computing-device since edits to content items are predicted and a user is able to input predicted edits to the computing device which saves burden of user input and gives an improved human to machine interaction. The technology uses neural networks which are trained to predict edits to content items and the result is a computing device which operates in an unconventional way.

Generally speaking, the examples described herein use data about small edits to content items, which are edits where a first version of the content item and a second version of the content item are mostly the same.

Figure 1:
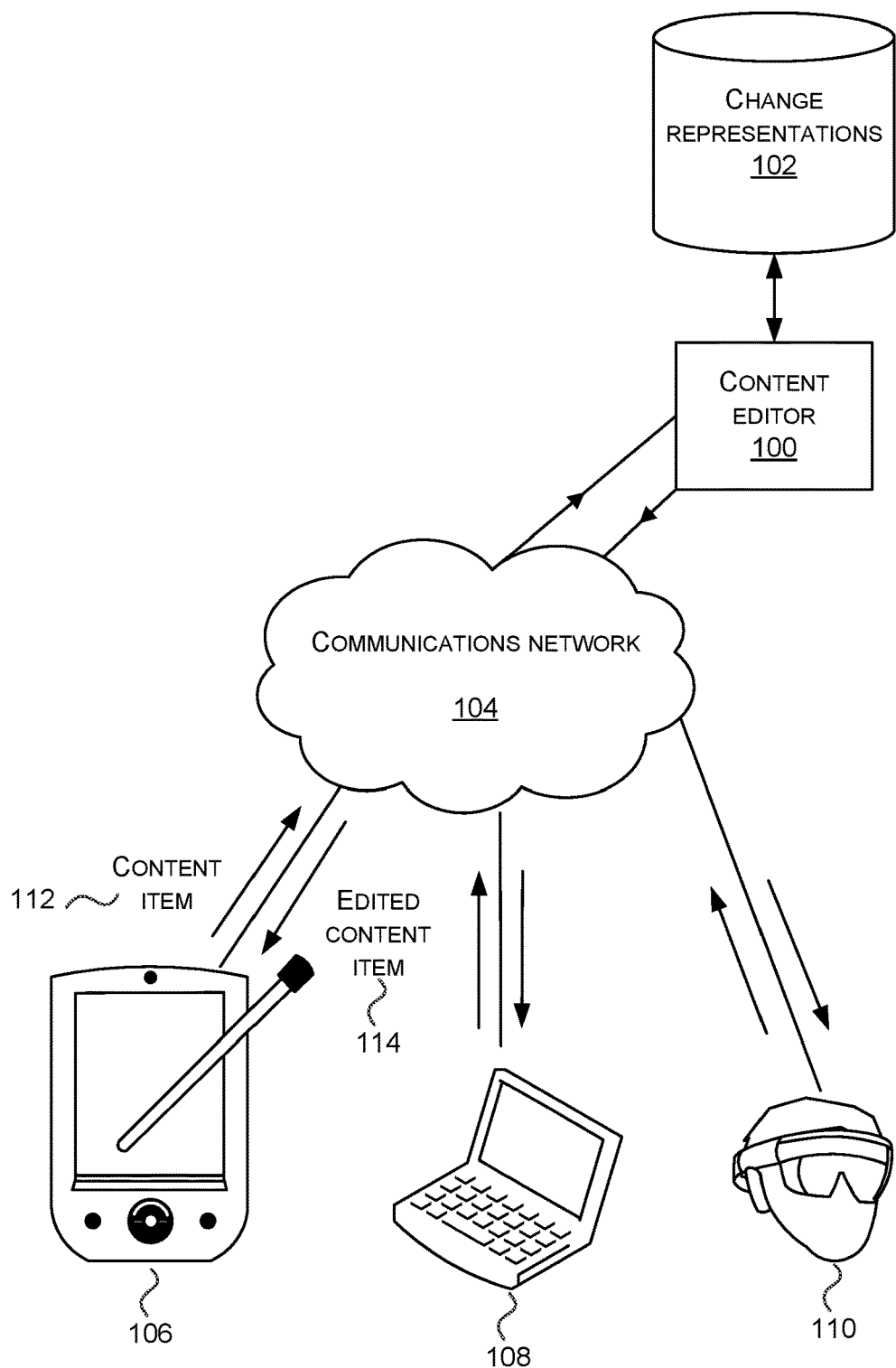
FIG. 1 is a schematic diagram of a content editor in communication with various end user devices over a communications network.

FIG. 1 is a schematic diagram of a content editor 100 in communication with one or more end user computing devices 106, 108, 110 via a communications network 104 such as the internet, an intranet or any communications network. The content editor 100 is computer implemented and an example of a computing-based device for deploying the content editor 100 is given later with respect to FIG. 9. The content editor 100 is optionally connected to, or has access to, a store of change representations 102. A change representation is numerical, such as a vector, and it specifies a point in a multi-dimensional space of possible changes to content items. Points in the multi-dimensional space which are close to one another represent changes to content items which are semantically similar. Change representations are explained in detail later in this document.

The content editor 100 receives content items 112 from the end user devices or from other entities in the communications network 104. A content item is data and a non-exhaustive list of examples of content items for use with the present technology is: image, video, text, email, blog post, social media post, audio file, code snippet, encyclopedia entry. The content editor computes, using a trained neural network, a predicted second version of the content item it received. The predicted second version is stored and/or sent to the originating end user device. Suppose there is a content item 112 to be edited. The trained neural network takes as input a representation of the content item 112 which comprises data of the content item and metadata about the content item. The neural network also takes as input a change representation which indicates, at a high level, how it is desired to edit the input content item 112. The change representation which is input to the neural network is computed from one or more of: user input, rules, a cluster of change representations, a store 102 of change representations. More detail about how the neural network is trained is given later in this document. At this point it is noted that by including metadata in the representation of the content item it is possible to train the neural network so that points which are close in the multi-dimensional space indicate semantically similar changes to content items.

Because the content editor is fully automated it significantly reduces the burden of user input at the end user computing devices 106, 108, 110. Suppose a user of a smart phone is trying to edit a text document to put the text document into a prose style. He or she is able to achieve the desired editing without having to manually type commands into the smart phone and without having to give complex spoken commands or gesture commands. The user of the smart phone indicates that editing is desired, or the smart phone predicts that editing is desired, and client software at the smart phone accesses the content editor 100 service via the communications network 104. A change representation which indicates the desired change is either sent from the end user device to the content editor, or is obtained from the change representation store 102. The content editor 100 computes an updated version of the text document by inputting a representation of the first version of the text document and the change representation into the neural network. The representation of the first version of the text document includes data from the text document and metadata such as paragraph length, ratio of adjectives to nouns, number of semi-colons or other metadata. The updated version of the text document is stored, suggested to the user, or used to replace the first version of the text document. In an example, the updated version of a text document is presented to a user at a user interface and the user is able to make a selection to input the updated version of the text document to an end user computing device or other computing device. As a result the end user has less complexity and manual input to edit the text document.

A user of a laptop computer who is trying to write software is able to significantly reduce the burden of manually typing code into the keyboard because the editing tool is able to edit code automatically according to change representations. When a programmer writes a code snippet, the content editor computes a representation of the code snippet such as a syntax tree, or a graph formed from the syntax tree according to metadata about the execution flow of the code snippet. The representation of the code snippet has data from the code snippet and metadata (also referred to as semantic information) about the code snippet. The editing tool is able to find a cluster of similar code snippets that it has been trained on and look up one or more change representations associated with that cluster. The looked up change representations are suggested to the programmer and/or one of the looked up change representations is selected and input to the trained neural network with the representation of the code snippet. The neural network then computes a predicted code snippet which is a predicted second version of the code snippet after having the change of the change representation applied. The predicted code snippet is then presented to the user at a graphical user interface or other user interface so that the programmer can input the predicted code snippet to the computing device. In this way the programmer can edit the code snippet without having to make complex typing or other commands at the user interface.

A user of an augmented reality computing device is able to edit an image he or she is viewing in the augmented reality environment and to do so with significantly reduced burden of user input. Without the content editor the user of the augmented reality computing device must give hand gesture commands and/or voice commands and it is difficult to obtain the fine granularity of instruction needed to edit an image using hand gestures or voice commands. Using the content editor, the image is automatically edited by the neural network according to a change representation. The neural network receives as input the image and it computes or selects a change representation of a change to be applied to the image. The change representation is computed from one or more of: user input, clusters of change representations, a database of change representations. The neural network computes a prediction which is a second version of the image where the change representation has been applied to the input image. The second version of the image is stored or displayed to a user. In this way the user can make edits to an image with simple or minimal user interface commands.

In the example of FIG. 1 the content editor has a processor which is configured to do one or more of: save the updated version of the content item, replace the input content item by the updated version, correct the input content item using the updated version, complete the input content item using the updated version.

In the example of FIG. 1 the content editor functionality is deployed as a cloud service. In other examples the content editor functionality is distributed between an end user device and a remote entity, or is deployed at an end user device.

Figure 2A:
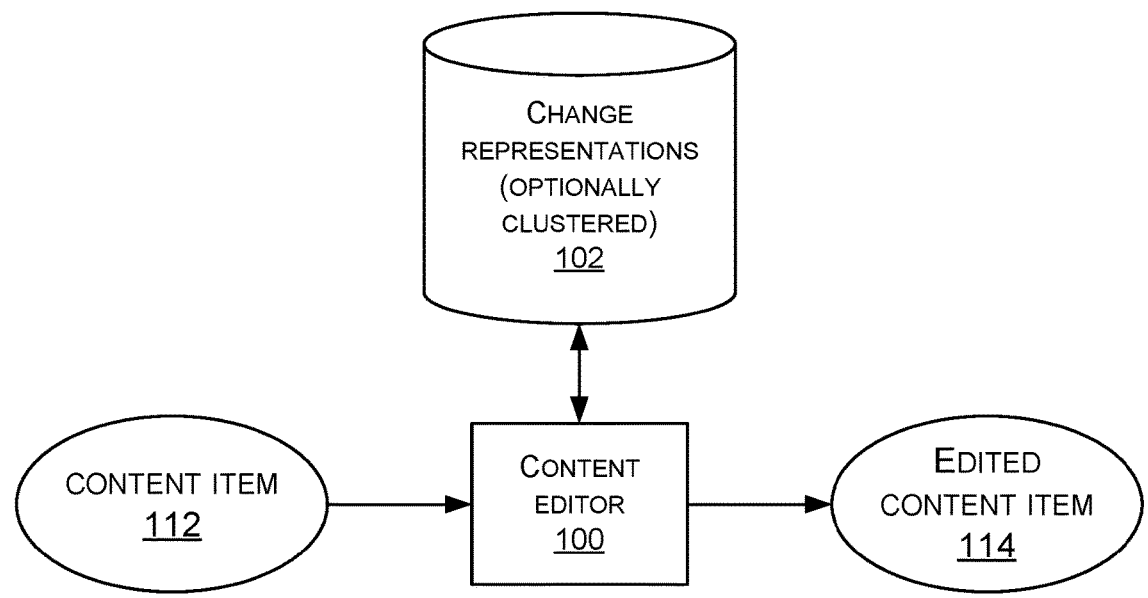
FIG. 2A is a schematic diagram of a content editor used to edit a content item.

In the example of FIG. 2A a content item 112 is input to a content editor 100. The content editor computes a representation of the content item and it selects a change representation. In an example the change representation is computed by selecting the change representation from a store 102. A neural network at the content editor 100 receives the representation of the content item and the change representation as input and it computes a prediction. The prediction is used to compute an edited version 114 of the content item.

Figure 2B:
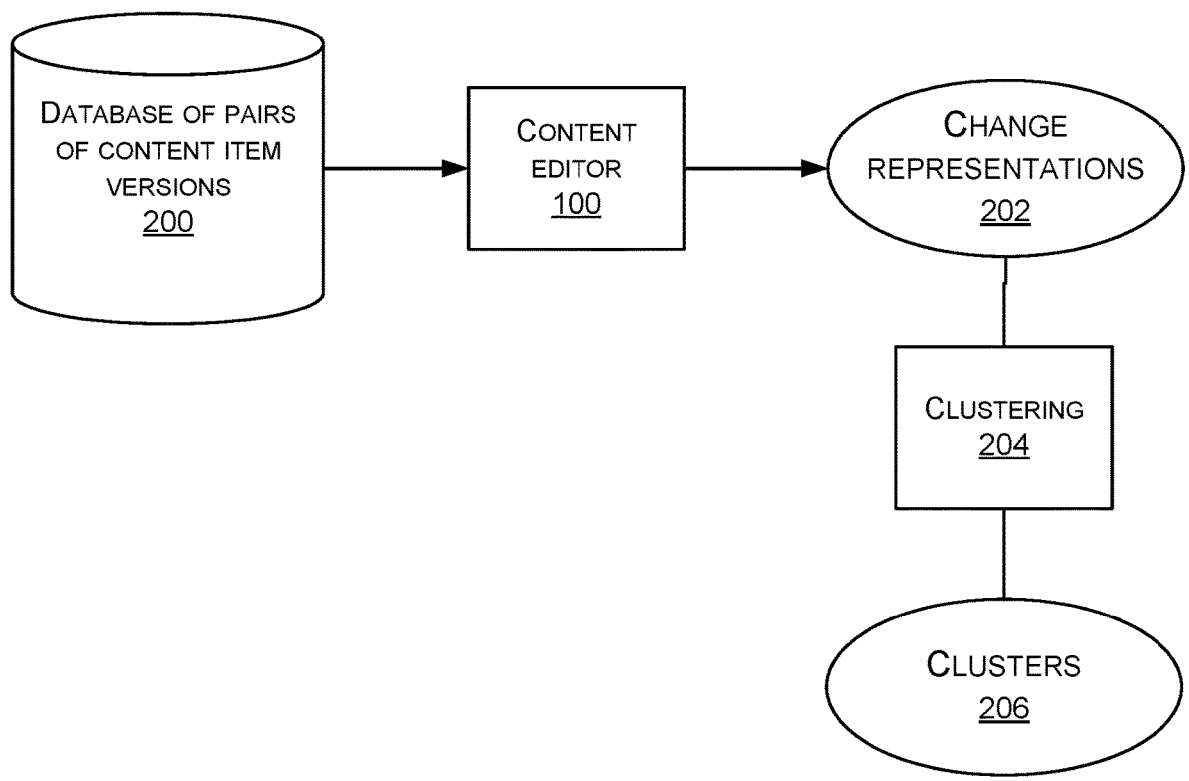
FIG. 2B is a schematic diagram of a content editor use to compute change representations from a corpus of pairs and showing clustering of the change representations.

In the example of FIG. 2B a database 200 of pairs of content item versions is available. Each pair of content item versions has a first version of a content item and a "ground truth" second version of the content item which has been observed after editing of the first version of the content item. For example, where the content items are emails, the first version is an email which has been automatically generated by a computer and the second version is the same email, after it has been edited by a particular person. For example, where the content items are code snippets, the first version is a code snippet which has been written by a person and the second version is the same code snippet after it has been edited to conform with a specified set of code design requirements. For example, where the content items are images, the first version is an image which has been captured by a photo journalist and the second version is the same image after it has been edited by a newspaper graphic artist.

A neural network in the content editor 100 takes as input an individual pair of content items from the database 200 and computes a prediction which is a change representation. The neural network computes a change representation for each of the pairs in the database 200 and this gives a plurality of change representations 202. The change representations are clustered by an unsupervised clustering process 204 such as k-means or any other clustering process. Thus a plurality of clusters 206 are computed, each cluster comprising change representations which are close together in the multi-dimensional change representation space.

The clusters 206 are used by the content editor 100 in various ways. In an example, such as the situation of FIG. 2A, the content editor 100 uses the clusters to compute a change representation to apply to content item 112. A cluster is selected based on properties of the content item 112 and clusters 206 (e.g. the content editor may be designed to select the most common cluster of changes) The content editor 100 then suggests to a user applying the change representation of the selected cluster. In another example, characteristics of the pairs in a cluster are computed and rules are automatically generated which say things like, if a content item exhibits the characteristics of a specified cluster, then automatically apply the change representation of the specified cluster. In another example, types of change are identified which correspond to the change representations of the clusters, and the types of change are offered to users in a menu of editing options provided by the content editor, or are used to automatically extract rules.

In another example, a writer is able to review the changes that the content editor regularly makes (identified as clusters of common changes), to avoid such problems in the future. In another example, a software development team is able to review the changes commonly made to fix bugs as illustrated by the clusters, to improve their engineering practices or develop techniques to automatically avoid such problems.

Figure 2C:
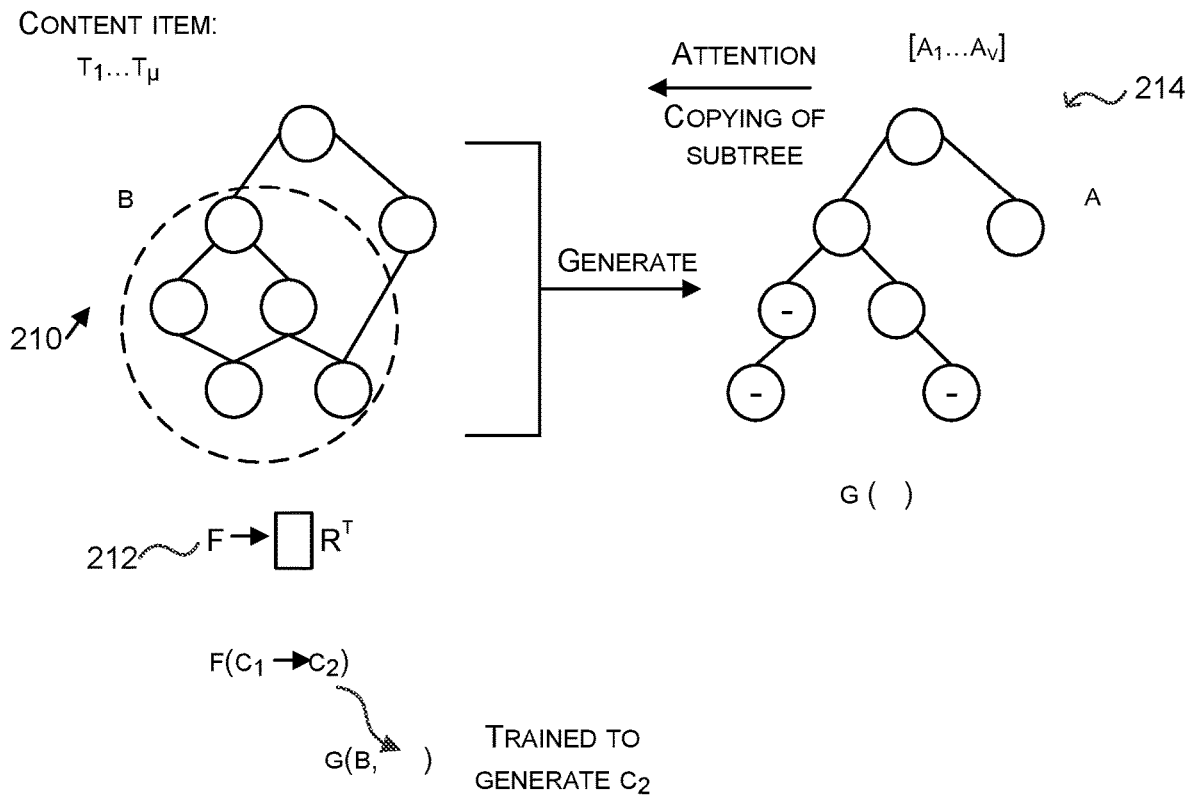
FIG. 2C is a schematic diagram of generation of a tree representing a content item, from a change representation and a graph representing a first version of the content item.

FIG. 2C shows a graphical representation 210 of a first version b of a content item such as a code snippet comprising a sequence of tokens $T_1 \ldots T_\mu$. Also shown in FIG. 2C is a schematic change representation 212 which is a vector illustrated as a rectangle where the vector is in a T dimensional real valued space denoted $R^T$. The graphical representation 210 and the vector 212 are input to a neural network which generates a prediction 214 (denoted A) which in this case is a tree. The tree is a syntax tree of a code snippet which is a predicted second version of the first version of the code snippet. The syntax tree is converted into a code snippet which is offered to a programmer as a suggestion or is used to replace or correct the original code snippet.

The graphical representation is computed by the end user device or by the content editor or any other entity. The graphical representation of the code snippet is computed by computing a syntax tree of the code snippet and adding edges to the syntax tree according to metadata about the code snippet. The code snippet comprises a sequence of tokens which are variables, operators, method names. The sequence of tokens is parsed to generate a syntax tree. Extra edges are added to the tree to create a graph. The extra edges indicate variable flows or other metadata about the code snippet.

In an example, two different types of extra edges are added to the syntax tree. A first type of extra edge is a syntactic edge, and a second type of extra edge is a semantic edge. Syntactic edges include next token edges and child edges that are used to represent the abstract syntax tree of the code snippet. Syntactic edges also include last lexical use edges that connect a token to the last time it occurred in the code snippet. Semantic edges comprise last use edges that connect a variable to the last time it was potentially used in program execution, last write edges that connect a variable to the last time it was written to in program execution, and computed from edges that connect a variable to the values it was computed from in program execution. Other types of semantic edge are possible which capture more information about program execution, for example aliasing between different program variables, data dependencies, etc.

Figure 3:
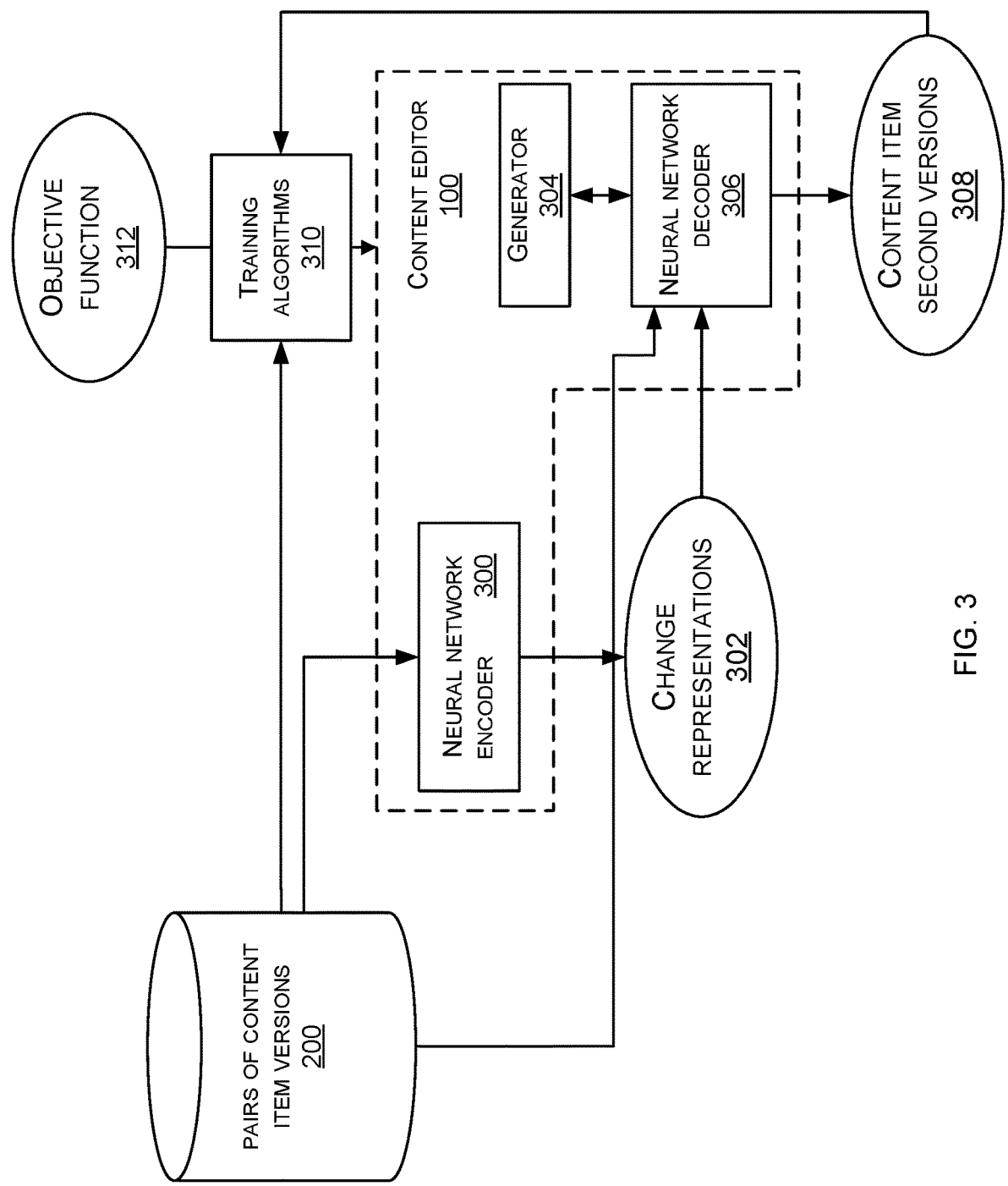
FIG. 3 is a schematic diagram showing more detail of a content editor.

FIG. 3 is a schematic diagram of a content editor 100 in more detail. The content editor 100 comprises a neural network encoder 300 and a neural network decoder 306 which has an associated generator 304. The neural network decoder computes predicted second versions 308 of content items. The content editor 100 is trained using pairs of "ground truth" content item versions 200. The pairs of content items versions 200 are as described with respect to FIG. 2B. Training algorithms 310 are used to train the content editor 100 such as neural network backpropagation or variations on neural network backpropagation. An objective function 312 used by the training algorithms 310 is expressed as:

Given an observed change comprising a pair of content item versions (b, a) a generator function is trained so that:

$$g(b,f(b,a))=a$$

Which is expressed in words as, a generator function taking as arguments a first version of a content item, and a vector of the change representation for the change from the first version of the content item to a second version of the content item, computes a second version of the content item. The symbol g is a function which is implemented by the neural network decoder 306 of FIG. 3. The symbol f is a function which is implemented by the neural network encoder 300 of FIG. 3.

In the case that the content items are text the neural network encoder is a recurrent neural network in some examples and the neural network decoder is a recurrent neural network.

In the case that the content items are images, in some examples the neural network encoder is a convolutional neural network and the neural network decoder is a deconvolutional neural network.

In the case that the content items are software, comprising code snippets, and the representation of a content item input to the encoder is a syntax tree, the neural network encoder is, in some examples, a recurrent neural network of the type suited to taking trees as input and predicting trees as output.

In the case that the content items are software, comprising code snippets, and the representation of a content item input to the encoder is a graph, the neural network encoder is, in an example, a graph neural network of the type suited to taking graphs as input and predicting trees as output.

Figure 4:
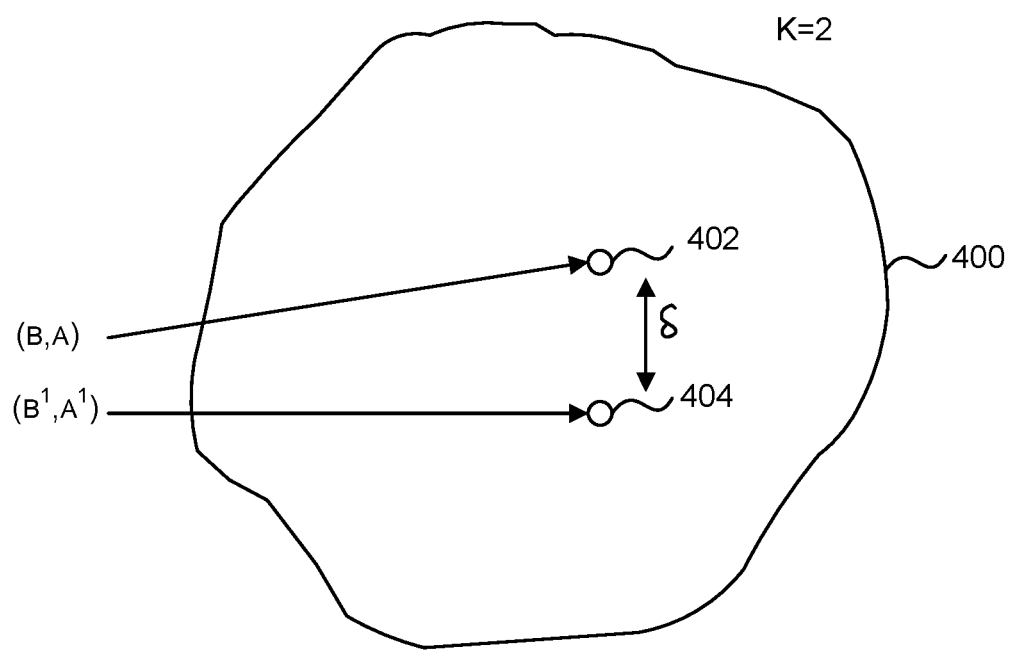
FIG. 4 is a schematic diagram of two change representations.

FIG. 4 is a schematic diagram of a change representation space 400 with two dimensions (denoted K=2). A change from B to A is represented by point 402 and a change from $B^1$ to $A^1$ is represented by point 404. The distance between the points 402, 404 is a measure of semantic similarity of the changes (B,A) and ($B^1$,$A^1$). In practice the change representation space has many dozens of dimensions although two are shown in FIG. 4 for ease of illustration.

Figure 5:
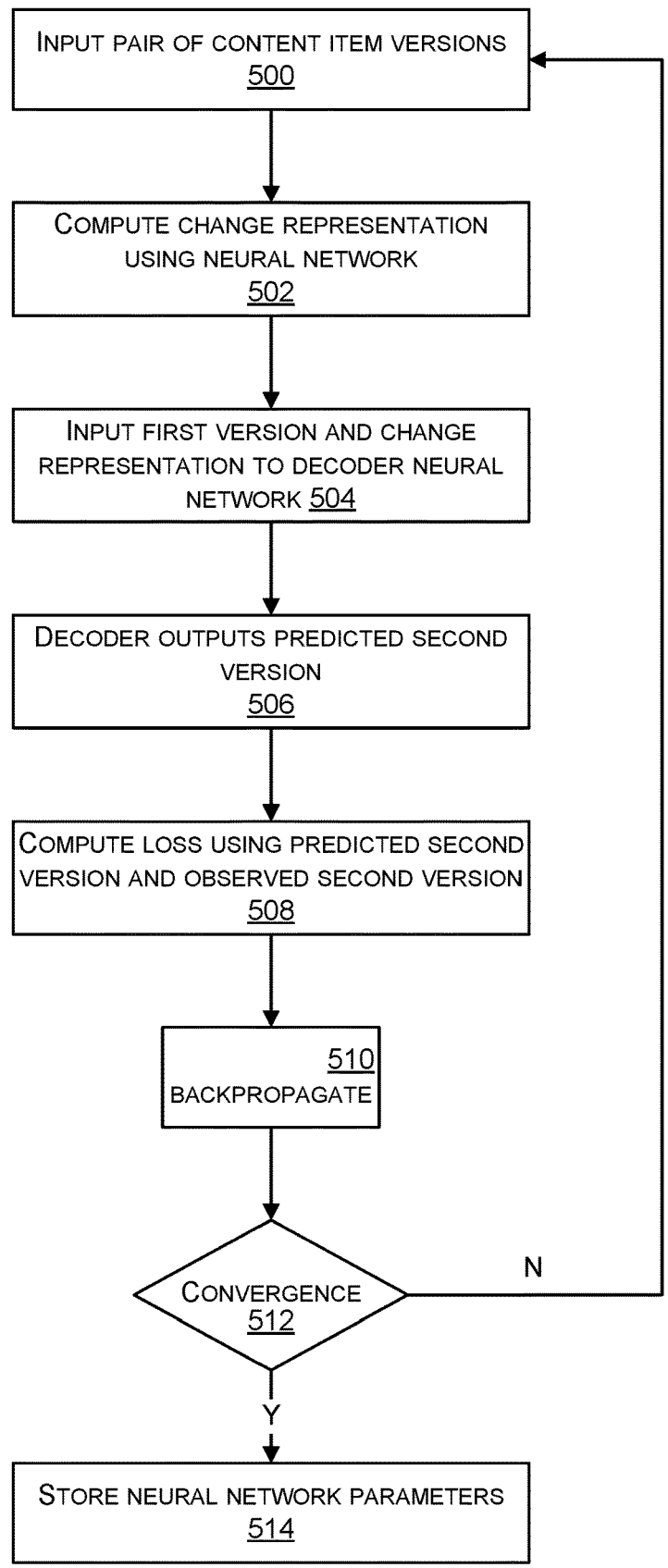
FIG. 5 is a flow diagram of a method of training a neural network of a content editor.

A method of training the content editor is now described with reference to FIGS. 3 and 5. The neural network encoder 300 takes representations of a content item pair as input 500 and computes 502 a change representation which is a vector in a multi-dimensional space. The first version of the content item from the content item pair, and the change representation are input 504 to a neural network decoder 306. The neural network decoder 306 together with generator 304 compute a predicted 506 second version 308 of the content item. The predicted second version 308 of the content item is compared 508 with the actual second version of the content item from the database 200 by the training algorithms 310. The training algorithms update (using back-propagation 510 or another update process) the neural network encoder 300 and the neural network decoder 306 according to the comparison and the objective function 312. If convergence is reached 512 the training process ends and the neural network parameters are stored 514. If convergence is not reached the process repeats from operation 500.

A method performed by the content editor after it has been trained is now described with reference to FIG. 6. A content item is received 600. The content item is text, or a code snippet, or an image, or another type of content item. Optionally a representation of the content item is computed 602. In one example where the content item is text or a code snippet a syntax tree or a graph is computed as the representation.

The content editor selects 604 a change representation. It does so using one or more of: clusters 616 of change representations of previous content item version pairs, user input, rules. The content editor inputs 606 the selected change representation and the representation of the content item (or the content item itself) into a trained neural network (the encoder and decoder of FIG. 3). The neural network encoder predicts 608 an edited content item and saves the prediction 610, or suggests the predicted content item to a user 612, or replaces 614 the received content item by the predicted content item.

Figure 7:
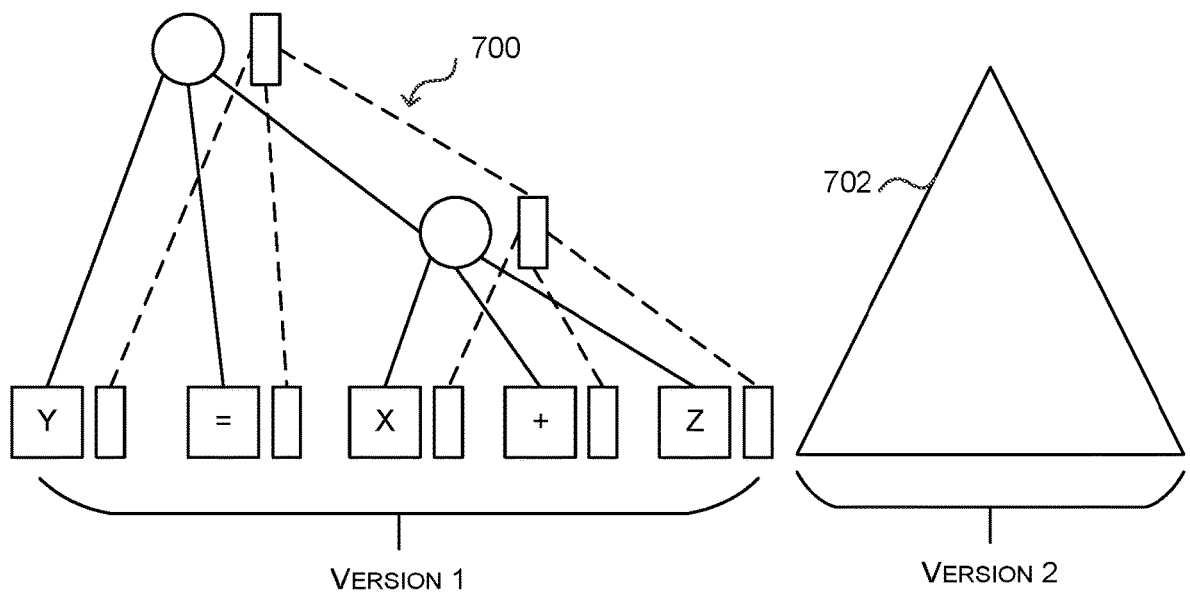
FIG. 7 is a schematic diagram of a tree representing a first version of a content item and a second tree representing a predicted second version of the content item.
Figure 7:
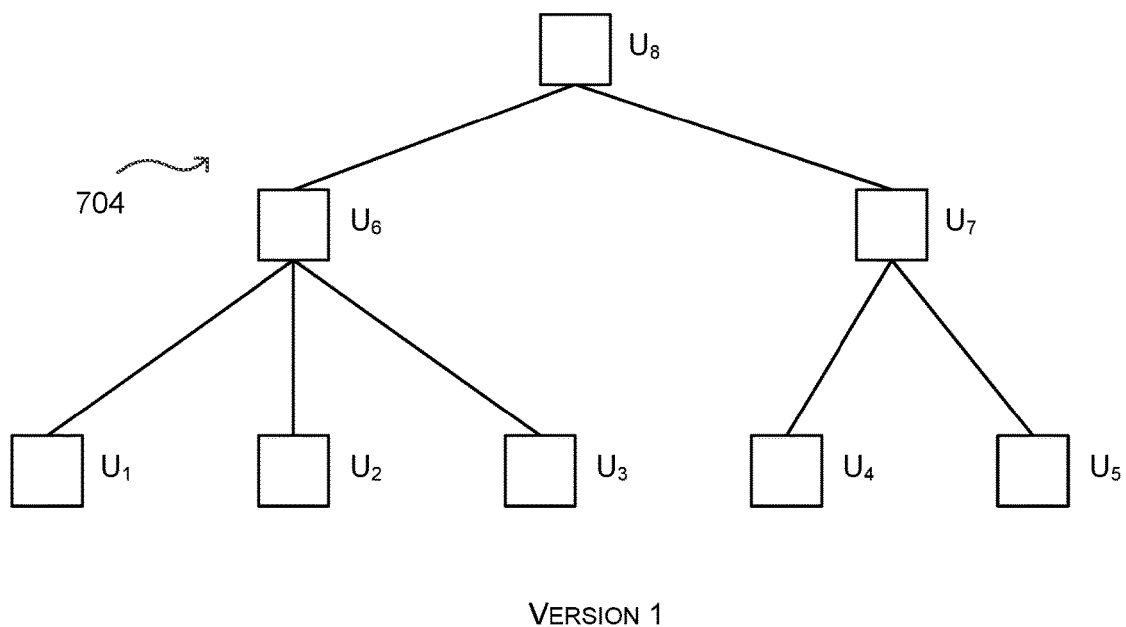

FIG. 7 shows a schematic diagram of a tree 700 representing a first version of a content item and a second tree 704 representing a predicted second version of the content item. The content item is a code snippet "y=x+z" and the tree 700 has one leaf for each token y, =, x, +, z. Tokens y and = are directly connected to a root node of the tree 700 whereas tokens x, +, z are connected to the root node via an intermediate node in order to reflect the addition operation expressed in the code snippet. Associated with each leaf node is a numerical value, such as a vector, denoted by v indexed by an index of the node number. Information from the leaf node numerical values is propagated back up the tree and stored at higher level nodes of the tree. In this way a parent node has information about a sub-branch of the tree extending from it. A similar tree 702 representing a second version of the code snippet is not yet known since it needs to be predicted by the content editor.

Figure 6:
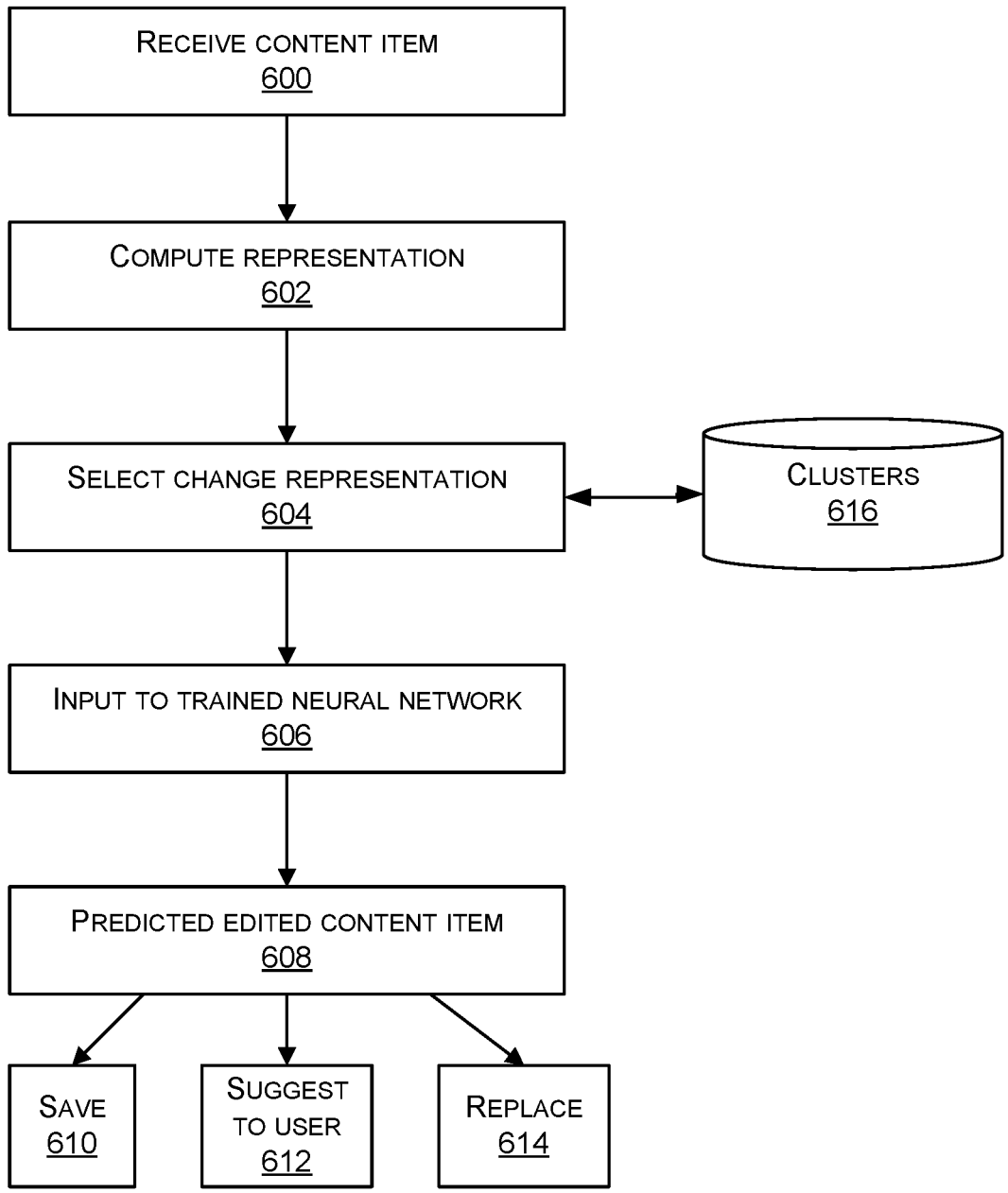
FIG. 6 is a flow diagram of a method performed by a content editor which has a neural network that has been trained.
Figure 8:
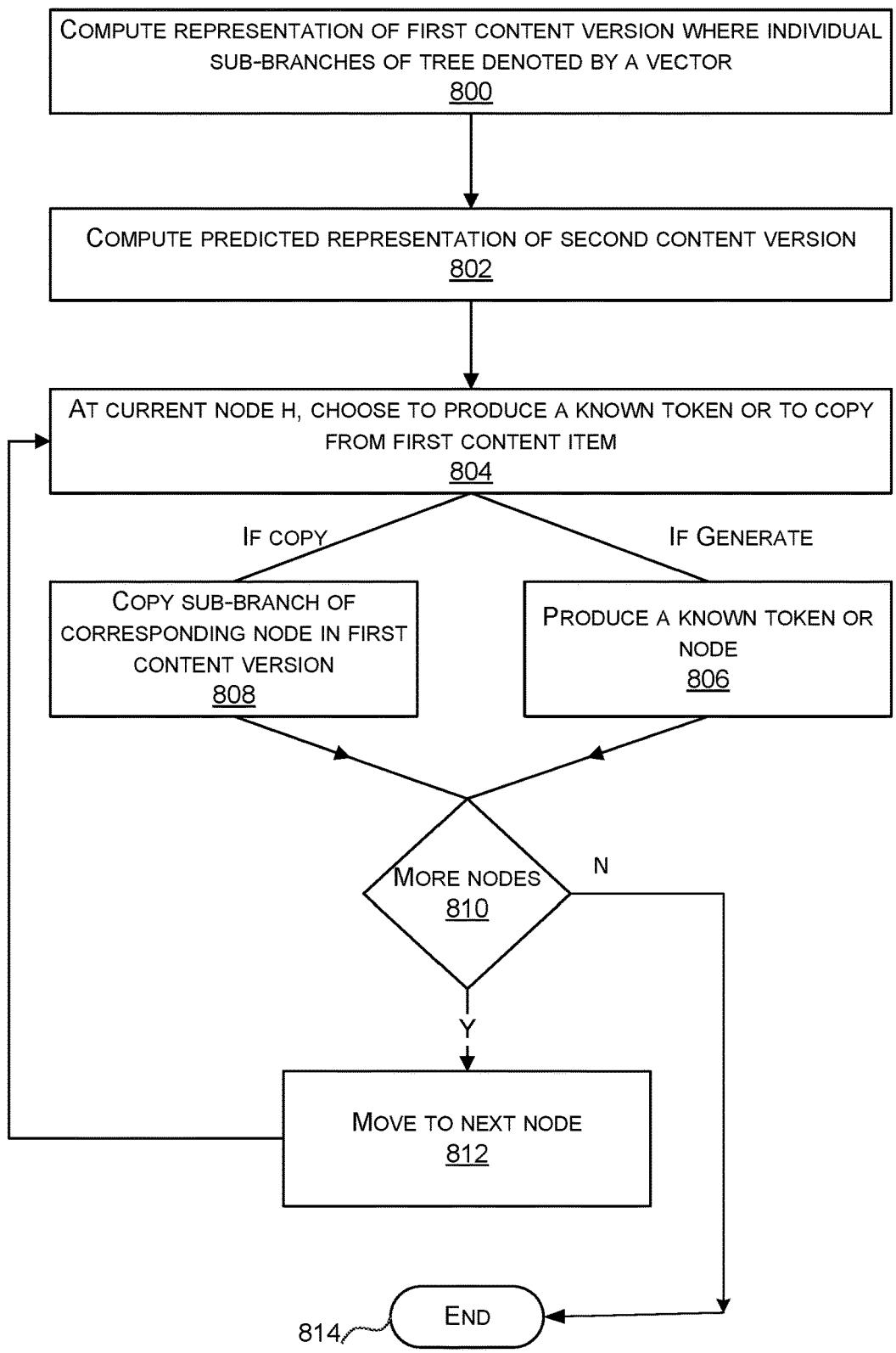
FIG. 8 is a flow diagram of a method performed by a generator.

The process of FIG. 6 is used where the representation at operation 602 is a tree such as tree 700. The result at operation 608 is a predicted tree 704 output by the neural network decoder. In this example the predicted tree 704 has eight nodes labelled U1 through U8. A generator such as generator 304 generates a code snippet from the predicted tree 704 as now described with reference to FIG. 8. The process of FIG. 8 enables the generator to copy sub-branches of the tree 700 representing the first version of the content item into the predicted tree 704 where appropriate. As a result quality of the predicted second versions of the content items is improved.

The generator has access to a tree representation 800 of the first content item where information about individual sub-branches of the tree is captured at parent nodes in the tree. The content editor computes 802 a tree representation of a predicted second version of the content item.

Starting at a root node of the tree representation of the predicted second version of the content item, the generator chooses 804 to either: produce a known token or node; or copy an item from the tree representing the first content. More detail about how the choice is made is given later.

If the generator chooses to copy, it copies 808 the sub-branch of the corresponding node in the tree of the first content version. If the generator chooses to generate, it produces 806 a known token by selecting a token from a specified plurality of possible tokens at random or in any other way.

The generator checks 810 if there are nodes that have not been processed yet in the tree of the predicted second version of the content item. If so, it moves 812 to the next node following a depth first order and repeats the process of FIG. 8 from operation 804. If there are no more nodes the process ends 814 and the generated token sequence is stored and output as the predicted second version of the content item.

Detailed examples using mathematical notation are now given.

Formally, assume an original version of some input $\chi_-$ and an edited version of that input $\chi_+$ where $\chi_-$ and $\chi_+$ are mostly the same. Given a dataset of edits $\{\chi_-^{(i)} \rightarrow \chi_+^{(i)}\}_{i=1}^{N}$, a goal is to learn a representation function $f_\Delta$ that maps an edit operation from $\chi_-$ to $\chi_+$ to a real-valued change representation $f_\Delta(\chi_-, \chi_+) \in \mathbb{R}^k$. A desired quality of $f_\Delta$ is for the computed change representations to have the property that semantically similar edits have close-by representations in $\mathbb{R}^k$.

A good change representation function $f_\Delta$ computes change representations that are then used to apply the same semantic edit $f_\Delta(\blacksquare, \blacksquare)$ to a new input in a one-shot way. This is achieved by learning a neural network of the content editor, the neural network referred to as a neural editor $\alpha$ that accepts a change representation and a new input and applies an edit to that new input. For example, given a change representation $f_\Delta(\chi_-, \chi_+)$ and a new input $\chi'_-$, it is possible to apply the semantically similar edit as $\chi'_+ = \alpha(\chi'_-, f_\Delta(\chi_-, \chi_+))$.

The technology described herein casts the change representation problem as an autoencoding-like task, with an aim to minimize the reconstruction error of $\alpha$ for the edited version $\chi_+$ given the change representation $f_\Delta(\chi_-, \chi_+)$ and the original version $\chi_-$. By limiting the capacity of $f_\Delta$'s output, the technology introduces a "bottleneck" that forces the overall framework to not simply treat $f_\Delta(\bullet, \chi_+)$ as an encoder and a as a decoder in a classical autoencoder setting; instead, optimizing for the objective requires $\alpha$ to obtain as much information about of $\chi_+$ from its input $\chi_-$.

Formally, given a probabilistic editor function $P_\alpha$, such as a neural network, and a dataset $\{\chi_-^{(i)} \rightarrow \chi_+^{(i)}\}_{i=1}^{N}$ the technology seeks to minimize the maximum likelihood loss:

$$\mathcal{L} = -\frac{1}{N} \sum_i \log P_\alpha(x_+ \mid x_-, f_\Delta(x_-, x_+)). \tag{1}$$

Which is expressed in words as, the maximum likelihood loss is equal to the negative of the reciprocal of the number of training pairs times the sum over the training pairs of the log of the predictions computed by the neural network given the training pairs and the change representations.

Neural networks are used to implement $P_\alpha$ and $f_\Delta$ as now described by non-limiting example.

The editor function neural network $P_\alpha$ takes as input the initial version $\chi_-$ and the change representation $f_\Delta(\chi_-, \chi_+)$ and learns to transform $\chi_-$ into $\chi_+$. Hence, encoder-decoder architectures with the ability to copy from the input are appropriate. In an example a sequence-to-sequence neural network model is used for text, and a graph-to-tree model is used for source code, whose known semantics are leveraged both on the encoder as well as on the decoder side. Other classes of edits, for example, image manipulation, are better served by convolutional models as described earlier in this document.

Sequence-to-Sequence Neural Editor

In an example a sequence-to-sequence neural network model with attention (over the tokens of $\chi_-$) is used. The architecture uses a bidirectional long term short term memory (LSTM) in the encoder and a token-level copying mechanism that directly copies tokens into the decoded sequence. In contrast to previous sequence-to-sequence models, the decoder takes as an additional input the change representation $f_\Delta(\blacksquare,570)$. Specifically, the decoder LSTM receives as an input the concatenation of the representations of the previous token and the change representation. This allows the LSTM decoder to take into consideration the change representation while generating the edited sequence.

Graph-to-Tree Neural Editor

In an example a graph-to-tree neural network is used which is able to take advantage of the additional structure of $\chi_-$ and $\chi_+$. To achieve this, a graph-based encoder is combined with a tree-based decoder. First, let $T(\chi)$ denote a tree representation of an element, e.g., the syntax tree of a fragment of source code. By encoding additional relationships (e.g., the "next token" relationship between terminal nodes, occurrences of the same token in several places, ...), this tree is extended to a graph. This yields a graph-based representation of $\chi_-$, which is denoted as $G(\chi)$. To encode $G(\chi_-)$ into a vector representation, the technology uses a gated graph neural network (GGNN). Similar to recurrent neural networks for sequences, GGNNs compute a representation for each node in the graph. These are used in a set of attention mechanisms within the decoder, explained below. Additionally, the representations for each node in the graph are used to obtain a representation of the full input $\chi_-$, by computing their weighted average in the following way: computing a score for each node, normalizing scores with a softmax, and using the resulting values as weights.

Specifically, generation of a tree T is represented as a sequence of actions $A(T)=[\alpha_1 \ldots \alpha_N]$. There are two possible types of actions as follows: ApplyRule actions that expand the current non-terminal using a grammar rule, and terminal actions that generate a terminal token from a vocabulary. The probability of taking an action is modelled as $p(\alpha_t|\alpha_{<t}, \chi_-)$, where $\chi_-$ is the original version of the input and $\alpha_{<t}$ is the partial tree that has been generated so far in the generation process. In practice, the dependence on the partial tree $\alpha_{<t}$ is modeled by an LSTM cell which is used to maintain state during the generation of the action sequence, as well as a "parent-feeding" trick in which the state of the LSTM when generating the parent node is used as an additional input. Additionally, the model uses an attention mechanism that allows the decoder to attend over the input sequence. The decoder is conditioned on the graph-level representation computed for $G(\chi_-)$ and uses the node representations from that graph as memories for the attention mechanism. The change representation $f_\Delta(\bullet)$ is used as an additional input.

Based on the observation that edits to source code often manipulate the syntax tree by moving expressions around, some but not all, embodiments of the technology add a facility to copy entire subtrees from the input. For this, we add a decoder action SubTreeCopy. This action copies the whole subtree pointed to.

Adding the SubTreeCopy action means that there are now many correct generation sequences for a target tree. This problem cannot be easily circumvented by marginalizing over all correct choices at each generation step, by normalizing the probability distribution over allowed actions to sum up those that have the same effect. The reason is that the lengths of action sequences representing different choices may differ as well. The problem is addressed during training by picking one correct generation sequence (the one greedily selecting SubTreeCopy when possible), and by changing the training objective such that no correct decoder action choice is penalized. To achieve this a "many-hot" encoding of correct choices is used. At test time, a beam search is used and merging beams resulting in identical results.

Change Representation

To compute a useful change representation, a model needs to focus on the differences between $\chi_-$ and $\chi_+$. A risk is that $f_\Delta$ degenerates into an encoder for $\chi_+$, turning $\alpha$ into a decoder. To avoid this, limit the capacity of the result of $f_\Delta$ by generating the change representation into a low-dimensional space $\mathbb{R}^N$ that acts as a bottleneck and encodes only the information that is needed to reconstruct $\chi_+$ from $\chi_-$.

Sequence Encoding of Edits

Given $\chi_-$ (resp. $\chi_+$) as sequence of tokens $t_-^{(0)}, \ldots t_-^{(T_-)}$ (resp. $t_+^{(0)}, \ldots t_+^{(T_+)}$), a diffing algorithm is used to compute an alignment of tokens in the two sequences. Extra symbols Ø are used for padding, + for additions, − for deletions, ↔ for replacements, and = for unchanged tokens to generate a single sequence representing both $\chi_-$ and $\chi_+$, such as the following sequence.

$$= \quad - \quad - \quad \leftrightarrow \quad + \quad =$$
$$t_-^{(0)} \quad t_-^{(1)} \quad t_-^{(2)} \quad t_-^{(3)} \quad \emptyset \quad t_-^{(4)} \ldots$$
$$t_+^{(0)} \quad \emptyset \quad \emptyset \quad t_+^{(1)} \quad t_+^{(2)} \quad t_+^{(3)}$$

Here, tokens $t_-^{(1)}$, $t_-^{(2)}$ were removed in the edit, $t_-^{(3)}$ was replaced by $t_+^{(1)}$, after which $t_+^{(2)}$ was added, etc. By embedding the three entries in each element of the sequence separately and concatenating their representation, it can be fed into a sequence encoder whose final state is the desired change representation.

Graph Encoding of Edits

As for the graph-to-tree neural editor, represent $\chi_-$ and $\chi_+$ as syntax trees $T(\chi_-)$ and $T(\chi_+)$. Combine these trees into a graph representation $G(\chi_- \rightarrow \chi_+)$ by combining both trees into one graph, using "Child" and "NextToken" edges. To connect the two trees, compute the same alignment as in the sequence case, connecting leaves that are the same and each replaced leaf to its replacement. Propagate this information up in the trees, i.e., two inner nodes are connected by "=" edges if all their descendants are connected by "=" edges.

Use the same "+"/"−"/"↔"/"=" tags for the initial node representation, computing it as the concatenation of the string label (i.e. token or nonterminal name) and the embedding of the tag. To obtain an change representation, use a graph neural network (GNN) unrolled for a fixed number of timesteps and again use the weighted averaging strategy described above.

Figure 9:
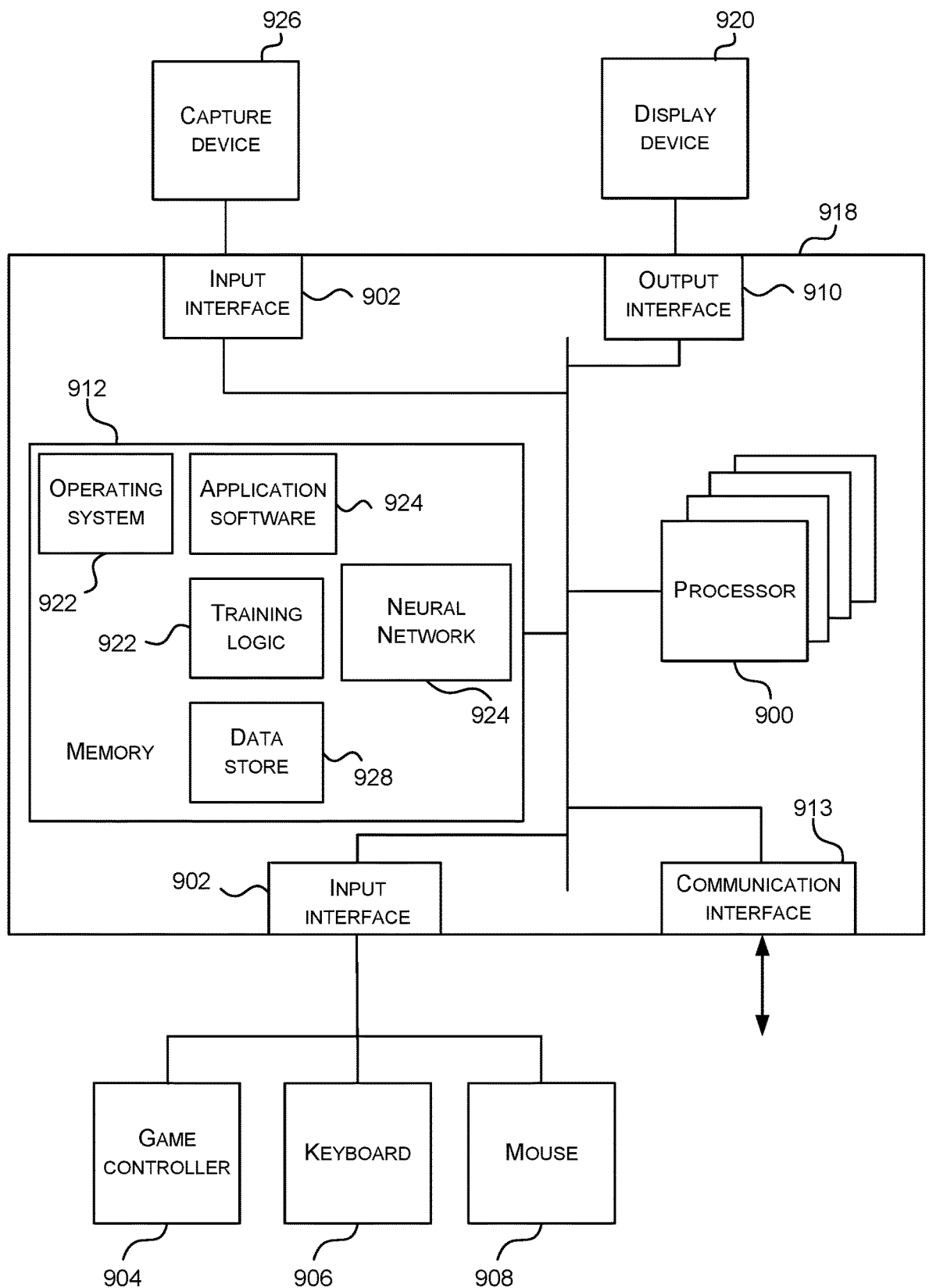
FIG. 9 illustrates an exemplary computing-based device in which embodiments of a content editor are implemented.

FIG. 9 illustrates various components of an exemplary computing-based device 918 which are implemented as any form of a computing and/or electronic device, and in which embodiments of a content editor are implemented in some examples.

Computing-based device 918 comprises one or more processors 900 which are microprocessors, controllers or any other suitable type of processors for processing computer executable instructions to control the operation of the device in order to edit content and/or predict second versions of content items from a first version of the content item. In some examples, for example where a system on a chip architecture is used, the processors 900 include one or more fixed function blocks (also referred to as accelerators) which implement a part of the method of training a content editor, and/or using a trained content editor in hardware (rather than software or firmware). Platform software comprising an operating system 922 or any other suitable platform software is provided at the computing-based device to enable application software 924 to be executed on the device. A neural network 926 is stored at the computing-based device 918 as well as an optional training logic 921 for training the neural network. A data store 928 holds content items, training parameters, predicted content items and other data.

The computer executable instructions are provided using any computer-readable media that is accessible by computing based device 900. Computer-readable media includes, for example, computer storage media such as memory 912 and communications media. Computer storage media, such as memory 912, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 912) is shown within the computing-based device 918 it will be appreciated that the storage is, in some examples, distributed or located remotely and accessed via a network or other communication link (e.g. using communication interface 913).

The computing-based device 918 also comprises an output interface 910 arranged to output display information to a display device 920 which may be separate from or integral to the computing-based device 918. The display information may provide a graphical user interface. An input interface 902 is arranged to receive and process input from one or more devices, such as a game controller 904, keyboard 906 or mouse 908 or other user input device. In some examples the user input device detects voice input, user gestures or other user actions and provides a natural user interface (NUI). This user input may be used to select change representations, view clusters, select suggested content item versions. In an embodiment the display device 920 also acts as the user input device if it is a touch sensitive display device. The output interface 910 outputs data to devices other than the display device in some examples.

Any of the input interface 902, output interface 910, display device 920 and the user input device may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

Clause 1. An editing tool comprising:
 a memory storing a neural network having been trained to compute a change representation from pairs, each pair comprising a representation of a first version of a content item and a second version of the content item, and for each of the change representations, predict an updated content item from the change representation and the first version of the content item;
 a processor configured to receive an input content item and to compute an updated version of the input content item according to a change representation, using the neural network.

Clause 2. The editing tool of clause 1 wherein the processor is configured to output a suggestion to a user the suggestion comprising the updated version of the input content item; and where the processor is configured to do one or more of: save the updated version, replace the input content item by the updated version, correct the input content item using the updated version, complete the input content item using the updated version.

Clause 3. The editing tool of any preceding clause wherein the change representation is a vector denoting a point in a multi-dimensional space in which semantically similar changes are close together.

Clause 4. The editing tool of any preceding clause wherein the processor is configured to compute a change representation to use when computing the updated version of the input content item.

Clause 5. The editing tool of clause 4 wherein the processor is configured to compute the change representation to use according to one or more of: rules, user input, each pair of content items comprising a first version of a content item and a second version of the content item.

Clause 6. The editing tool of any preceding clause wherein the content items are text or software and the neural network is configured to receive as input a representation of the content item as a tree or graph.

Clause 7. The editing tool of any preceding clause wherein the processor is configured to use the neural network to compute a change representation for each of a plurality of the pairs, to cluster the change representations, and to use the clusters for one or more of: making suggestions to users, creating rules, identifying change representations to be applied to content items.

Clause 8. The editing tool of any preceding clause wherein the content items are software and the neural network is configured to receive as input a representation of the content item as a graph formed by parsing a sequence of tokens of the software to form a tree and by adding edges to the tree on the basis of program analysis of the software.

Clause 9. The editing tool of any preceding clause wherein the content items are software and wherein the processor is configured to compute a graphical representation of a content item by parsing tokens of the software to form a tree and adding edges to the tree according to program analysis results of the software.

Clause 10. The editing tool of clause 8 wherein the processor is configured to add edges to the tree according to one or more of: connecting a variable to a last time the variable was used in program execution of the software, connecting a variable to a last time it was written to in program execution of the software, connecting a variable to values it was computed from in program execution of the software, aliasing in program execution of the software, points-to analysis in program execution of the software, path conditions in program analysis of the software.

Clause 11. The editing tool of any preceding clause wherein the neural network comprises a recurrent neural network and the content items are text or software.

Clause 12. The editing tool of any preceding clause wherein the neural network comprises a convolutional neural network and a deconvolutional neural network and the content items are images.

Clause 13. The editing tool of any preceding clause wherein the content items are text or software and the neural network comprises a tree to tree, or a graph to tree neural network.

Clause 14. The editing tool of any preceding clause wherein the editing tool comprises a generator configured to generate a second version of a content item from a first version of the content item by choosing whether or not to copy sub-branches of a tree representing the first version of the content item into the generated second version of the content item.

Clause 15. A computer-implemented method of editing a content item comprising:
  storing in a memory a neural network having been trained to compute a change representation from pairs, each pair comprising a representation of a first version of a content item and a second version of the content item, and for each of the change representations, predict an updated content item from the change representation and the first version of the content item
  receiving, at a processor, an input content item;
  computing using the processor, an updated version of the input content item according to a change representation, using the neural network.

Clause 16. The method of clause 15 comprising computing a change representation to use when computing the updated version of the input content item.

Clause 17. The method of clause 14 comprising computing the change representation to use according to one or more of: rules, user input, similarity of the input content item to one of a plurality of clusters of pairs of content items, each pair of content items comprising a first version of a content item and a second version of the content item.

Clause 18. The method of claim 15 comprising receiving as input a representation of the content item as a graph formed by parsing a sequence of tokens of the software to form a tree and by adding edges to the tree on the basis of program analysis of the software.

Clause 19. The method of claim 15 comprising generating a second version of a content item from a first version of the content item by choosing whether or not to copy sub-branches of a tree representing the first version of the content item into the generated second version of the content item.

Clause 20. An editing tool comprising:
  a memory storing a neural network having been trained to compute a change representation from pairs, each pair comprising a representation of a first version of a code snippet and a second version of the code snippet, and for each of the change representations, predict an updated code snippet from the change representation and the first version of the code snippet;
  a processor configured to receive an input code snippet and to compute an updated version of the input code snippet according to a change representation, using the neural network;
  wherein the processor computes a graphical representation of the input code snippet for input to the neural network.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. An editing tool comprising:
a memory storing a neural network having been trained to compute a plurality of change representations from pairs of content items; and
a processor configured to:
receive an input code snippet;
generate a representation of the code snippet according to metadata for an execution flow of the code snippet;
identify a cluster of similar code snippets that have been trained on the neural network;
identify one or more change representations associated with the cluster;
select a change representation from the one or more change representations; and
compute an updated version of the input code snippet based on the comparing of the selected change representation, using the neural network.

2. The editing tool of claim 1 wherein the processor is further configured to:
output a suggestion to a user, the suggestion comprising the updated version of the input code snippet; and
one or more of: save the updated version, replace the code snippet item by the updated version, correct the input code snippet using the updated version, and complete the code snippet item using the updated version.

3. The editing tool of claim 1 wherein the processor is further configured to automatically replace the input code snippet with the updated version of the code snippet.

4. The editing tool of claim 1 wherein the processor is further configured to compute a change representation to use when computing the updated version of the input code snippet.

5. The editing tool of claim 4 wherein the processor is further configured to compute the change representation to use according to one or more of: rules and user input, wherein each pair of content items comprising a first version of a code snippet and a second version of the code snippet.

6. The editing tool of claim 1 wherein the input code snippet is an older version of the updated version of the code snippet.

7. The editing tool of claim 1 wherein the processor is further configured to use the neural network to compute a change representation for each of a plurality of the pairs, to cluster the change representations, and to use the clusters for one or more of: making suggestions to users, creating rules, and identifying change representations to be applied to code snippets.

8. The editing tool of claim 1 wherein the code snippets are software and the neural network is configured to receive, as input, a representation of the code snippet as a graph formed by parsing a sequence of tokens of the software to form a tree and by adding edges to the tree on a basis of program analysis of the software.

9. The editing tool of claim 1 wherein the code snippets are software and wherein the processor is further configured to compute a graphical representation of a code snippet by parsing tokens of the software to form a tree and adding edges to the tree according to program analysis results of the software.

10. The editing tool of claim 9 wherein the processor is further configured to add edges to the tree according to one or more of: connecting a variable to a last time the variable was used in program execution of the software, connecting a variable to a last time it was written to in program execution of the software, connecting a variable to values it was computed from in program execution of the software, aliasing in program execution of the software, points to analysis in program execution of the software, and path conditions in program analysis of the software.

11. The editing tool of claim 1 wherein the neural network comprises a recurrent neural network and the code snippets are text or software.

12. The editing tool of claim 1 wherein the neural network comprises a convolutional neural network and a deconvolutional neural network and the code snippets are images.

13. The editing tool of claim 1 wherein the code snippets are text or software and the neural network comprises a tree to tree, or a graph to tree neural network.

14. The editing tool of claim 1 wherein the editing tool comprises a generator configured to generate a second version of a code snippet from a first version of the code snippet by choosing whether or not to copy sub-branches of a tree representing the first version of the code snippet into the generated second version of the code snippet.

15. A computer-implemented method of editing a content item comprising:
storing in a memory a neural network having been trained to compute a plurality of change representations from pairs of content items;
receiving, at a processor, an input code snippet;
generating a representation of the code snippet according to metadata for an execution flow of the code snippet
identifying a cluster of similar code snippets that have been trained on the neural network;
identifying one or more change representations associated with the cluster;
selecting a change representation from the one or more change representations based on the input code snippet; and
computing, using the processor, an updated version of the input code snippet based on the comparing of the selected change representation, using the neural network.

16. The method of claim 15, further comprising computing a change representation to use when computing the updated version of the input code snippet.

17. The method of claim 16, further comprising computing the change representation to use according to one or more of: rules, user input, and similarity of the input code snippet to one of a plurality of clusters of pairs of content items, wherein each pair of content items comprises a first version of a code snippet and a second version of the code snippet.

18. The method of claim 15, further comprising receiving, as input, a representation of the code snippet as a graph formed by parsing a sequence of tokens of the software to form a tree and by adding edges to the tree on the basis of program analysis of a software code snippet.

19. The method of claim 15, further comprising generating a second version of a code snippet from a first version of the code snippet by choosing whether or not to copy sub-branches of a tree representing the first version of the code snippet into the generated second version of the code snippet.

20. An editing tool comprising:
a memory storing a neural network having been trained to compute a plurality of change representations from pairs of content items; and
a processor configured to:
receive an input code snippet;
generate a representation of the code snippet according to metadata for an execution flow of the code snippet;
identify a cluster of similar code snippets that have been trained on the neural network;
identify one or more change representations associated with the cluster;
select a change representation from the one or more change representations based on the input code snippet; and
compute an updated version of the input code snippet based on the comparing of the selected change representation, using the neural network;
wherein the processor computes a graphical representation of the input code snippet for input to the neural network.

* * * * *